United States Patent [19]

Townsley

[11] Patent Number: 5,437,701
[45] Date of Patent: Aug. 1, 1995

[54] AIR FILTER AND METHOD OF CONSTRUCTION

[75] Inventor: David M. Townsley, McKinney, Tex.

[73] Assignee: S.T. Technologies, Inc., Plano, Tex.

[21] Appl. No.: 102,350

[22] Filed: Aug. 5, 1993

[51] Int. Cl.⁶ ............................................. B01D 46/00
[52] U.S. Cl. ........................................ 55/486; 55/487; 55/524; 55/DIG. 24; 95/285
[58] Field of Search ............... 55/486, 487, 522, 524, 55/DIG. 13, DIG. 24, DIG. 42; 95/285, 287

[56] References Cited

U.S. PATENT DOCUMENTS

| | | |
|---|---|---|
| Re. 13,849 | 3/1985 | Klein . |
| 2,780,308 | 2/1957 | Mullin et al. ............... 55/DIG. 24 |
| 2,837,170 | 6/1958 | Armstrong et al. ............ 55/524 |
| 2,865,466 | 12/1958 | Frohmader . |
| 2,961,710 | 11/1960 | Stark ........................ 55/DIG. 13 |
| 3,116,969 | 1/1964 | Coleman, Jr. . |
| 3,201,926 | 8/1965 | Harrington ................... 55/524 |
| 3,246,767 | 4/1966 | Pall et al. . |
| 3,284,361 | 11/1966 | Rocchini et al. . |
| 3,458,338 | 7/1969 | Adams et al. ................. 55/524 |
| 3,521,429 | 7/1970 | Leffler ....................... 55/524 |
| 3,573,158 | 3/1971 | Pall et al. . |
| 4,239,516 | 12/1980 | Klein . |
| 4,308,303 | 12/1981 | Mastroianni et al. . |
| 4,353,945 | 10/1982 | Sampson . |
| 4,395,332 | 6/1983 | Klein . |
| 4,396,565 | 8/1983 | Tomita et al. . |
| 4,450,681 | 5/1984 | Sato et al. . |
| 4,569,813 | 2/1986 | Taki et al. . |
| 4,631,077 | 12/1986 | Spicer et al. ............... 55/DIG. 13 |
| 4,631,297 | 12/1986 | Battice et al. . |
| 4,758,460 | 7/1988 | Spicer et al. ................. 55/487 |

Primary Examiner—C. Scott Bushey
Attorney, Agent, or Firm—Charles D. Gunter, Jr.

[57] ABSTRACT

The invention relates to a method of treating reticulated foam with a controlled migration treatment medium to produce an improved air filter. Reticulated foam is treated with a highly viscous oil that protects the foam from hydrolytic degradation and increases efficiency of the filter without causing unacceptable air restriction of the foam. An improved air filter made from treated and untreated layers of reticulated foam is also shown.

5 Claims, 1 Drawing Sheet

AIR FILTER AND METHOD OF CONSTRUCTION

BACKGROUND OF THE INVENTION

1. Field of the Invention

The present invention relates generally to air filters of foam type construction and, more specifically, to an improved foam filter and method of construction which provides a foam filter having increased efficiency while maintaining a desired filter capacity and without adversely affecting the restriction characteristics of the filter.

2. Description of the Prior Art

In a polluted world, efficient air filters perform an important function. These filters clean the air of particulate matter that can clog and corrode expensive equipment, such as automobile engines, furnaces and air conditioners. In automobiles, air filters must filter out the maximum quantity of air pollutants without decreasing or restricting the amount of air available to the vehicle for combustion. In a furnace or air conditioner, the air filter traps particulates from the air prior to heating or cooling the air and blowing the heated or cooled air throughout the house.

Currently, automotive air filters are typically made of pleated paper housed in a plastic or metal frame. They are used once and then discarded. The paper, however, is limited in its ability to remove particulate matter. In the age of self-service gas stations and vehicles without carburetors that require infrequent tune-ups, car owners frequently neglect to check under the hood and remove dirty filters. These dirty filters hinder engine performance and contribute to engine destruction.

Foam air filters can be used to overcome certain of the deficiencies associated with the prior art pleated paper filters. In particular, "reticulated" foams can be produced which offer the possibility of filtering efficiencies not previously achievable with the pleated paper type air filters. Reticulated foams of the type under consideration are generally described in the literature as being of either the "polyether" or "polyester" type. Each type of prior art foam has certain desirable and undesirable characteristics. For example, polyester foams can currently be manufactured having the smaller porosities needed for certain applications, such as for use in automotive filters. Polyester foams are currently available in the pore size range from about 3 pores per inch (ppi) to about 90–110 ppi. Heat and moisture, unfortunately, hydrolytically degrade the prior art polyester foams, making them unsuitable for some applications. Polyether foams are less affected by elevated temperature and moisture conditions. Thus, while the polyether foams are less susceptible to hydrolytic degradation than are polyester foams, the polyether foams have generally been commercially available only in larger pore size ranges. Typical commercially available polyether foams are available in pore sizes ranging from about 3 ppi to about 70–80 ppi. These pore sizes are not small enough for some applications.

Dry foams filter like a sieve under dry conditions. The prior art has recognized that, if a low viscosity oil treatment is applied to a dry foam filter, the filter action changes and the efficiency of filtering increases. The air filters on many lawn and garden engines have consequently been treated with lower viscosity oils such as motor oils, in the past. The prior art oil treatments have proved problematical in many cases, however, in that the oil tended to migrate by gravity flow within the filter medium. This left one region of the filter relatively dry and subsequently less efficient in operation while another region of the filter was saturated or overtreated. Additionally, many of the prior art lower viscosity oils are lost from the foam filter during use, as where the filter medium is exposed to increasing air flow velocity.

One object of the present invention is to produce a foam type air filter that resists hydrolytic degradation while it efficiently removes airborne particulate matter without substantially restricting air passage.

Another object of the invention is to treat a foam type air filter with a controlled migration treatment medium which increases the filter efficiency and yet which does not migrate through the filter in an unacceptable fashion.

Another object of the invention is to treat a polyester type foam filter to provide a filter which is highly resistant to water and which is stable under elevated temperature conditions, thereby allowing the use of a smaller cell sized foam for needed applications.

Another object of the invention is to provide a foam filter having a controlled migration treatment medium and multiple layer construction in order to provide a working filter having the highest capacity, highest efficiency and lowest restriction possible.

SUMMARY OF THE INVENTION

The improved foam filters of the invention have applied thereto a controlled migration treatment medium which increases the filters' efficiency while also increasing the filters' resistance to hydrolytic degradation. By providing the assembled air filter as a plurality of layers of varying porosity foam, a filter of increased efficiency with acceptable capacity can be produced.

In the preferred method of the invention, a highly viscous oil, such as polybutene, is diluted with a solvent, such as 1.1.1. trichloroethane, and applied to a reticulated foam filter material. In those applications requiring extremely fine pore sizes, polyester based polyurethane foam is selected as the filter material with the oil being applied using an adjustable roller system. After application, the treated filter is cured to flash off the 1.1.1. trichloroethane. In those filtering applications where larger pore sizes are acceptable, polyether based foams are the preferred filter material with the same oil treatment being applied. By using treated and untreated foam layers within a single foam air filter, it is possible to increase filtering efficiency beyond that achievable with presently available paper air filters and other foam type filters while also increasing filter capacity.

Additional objects, features and advantages will be apparent in the written description that follows.

BRIEF DESCRIPTION OF THE DRAWINGS

The FIG. 1 shows an air filter produced by the method of the invention, portions of the filter being broken away for ease of illustration.

DETAILED DESCRIPTION OF THE INVENTION

Figure 1:
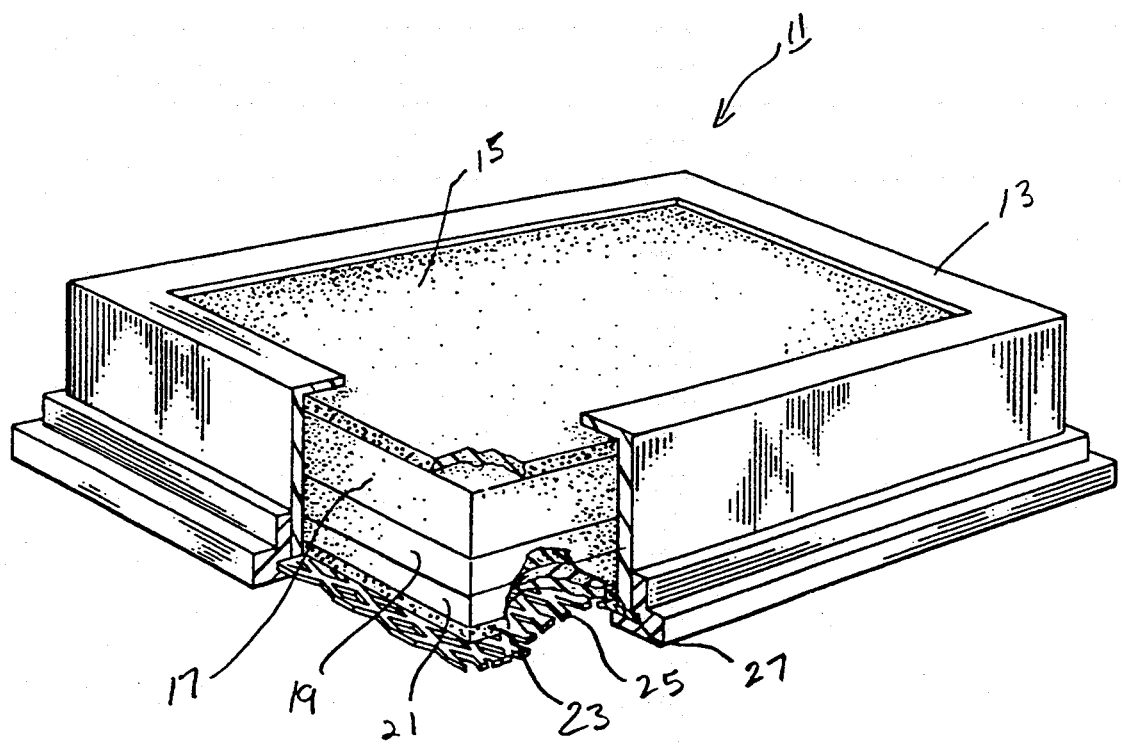

In the method of the invention, a foam filter is treated with a special controlled migration treatment medium to produce a filter having improved efficiency and increased filter capacity. The treated foam filter resists hydrolytic degradation while retaining a high efficiency for removing particulate matter, such as dust, from the air and without substantially restricting air flow. In this disclosure, the term "filter" refers to the filtering material for an air filter. The term "air filter" refers to the assembled product which includes the filtering material and may include housing means.

The foam filter material used in the manufacture of the air filters of the invention is known in the relevant industry as a reticulated or microcellular foam. Any of a number of commercially available reticulated foams can be used, for example the polyester and polyether based polyurethane formulations. The choice of whether to use the polyester or polyether foam will depend upon the intended application, as previously discussed. Thus, for larger pore size filters, polyether foams will generally be preferred, especially if the filter will be subjected to extremes of moisture and temperature. For smaller pore size applications, such as in automotive filters, the polyester foams will generally be utilized to some degree in order to obtain the desired 90-110 ppi final filtering material. Both polyester based polyurethane foams and polyether based polyurethane foams are available from FOAMEX, Eddystone, Penn., and are acceptable for the purposes of the present invention.

The polyester or polyether foam filter material is then treated with a controlled migration treatment additive which increases its efficiency, moisture resistance and capacity. The treatment medium includes any limited or controlled migration substance that does not degrade the reticulated foam, is highly resistant to water, is stable in high heat conditions and protects the foam against hydrolytic degradation without decreasing a measured particulate removal efficiency to below at least about 98% and not substantially restricting the flow of air. Preferably, the controlled migration medium is a natural or synthetic liquid such as a mineral oil, hydrocarbon oil, synthetic hydrocarbon oil, or their derivatives having a specified viscosity so as to have controlled migration characteristics, most preferably being essentially non-migrating upon application to the filter material. The preferred treatment mediums are highly viscous, liquid hydrocarbon oils. A particularly preferred treatment medium is polyisobutene or polybutene such as INDOPOL available from AMOCO Chemical Co. It is described as a viscous, non-drying liquid which is comprised predominantly of high molecular weight mono-olefins with minor isoparaffin content.

To be acceptable for purposes of the present invention, the controlled migration treatment additive must have a Saybolt Universal viscosity within the range from about 8,500 to about 36,000 SUS, preferably about 10,000 to 25,000 SUS, as determined by ASTM D2161 at 38° C. (100° F.). As such, the compositions of the invention are distinguishable from prior art treatments such as mineral or petroleum oils having typical viscosities of SAE 5 to SAE 100 weights, or greases. The controlled migration treatments of the invention can be used alone or as a blended mixture. Depending upon the degree of efficiency required, the required capacity and conditions of use, a treatment can be chosen within the above viscosity range, whether a single weight or a mixture of blended weights of polybutene are used. The AMOCO H-50 Polybutene has a Saybolt Universal viscosity of 15,500 SUS as determined by ASTM D2161 at 38° C. (100° F.); a density of 7.34 lb/gal (ASTM d1298); and a molecular weight of 750 (number average, vapor phase osmometry).

Because of the increased viscosity of the controlled migration treatment mediums used in the present invention (as compared to, for example, motor oils), they could be difficult to apply using prior art application methods. One method which has been found to work satisfactorily for applying the treatment mediums of the invention to reticulated foams is to dilute the treatment medium with a suitable solvent prior to application. Many solvents can be utilized as long as they do not degrade the foam or react with the treatment medium, and can be removed at the end of the treatment. When using polybutene, 1.1.1. trichloroethane is a preferred solvent. 1.1.1. trichloroethane is preferably mixed at one part solvent to about 0.66 to 5.66 parts polybutene as determined by weight. For example, 1 kg of 1.1.1. trichloroethane is mixed with 0.66 to 5.66 kg polybutene. Other typical solvents known in the art include trichloroethylene, freon and mineral spirits. It is preferred to apply the controlled migration treatment medium of the invention by heating the medium to reduce its viscosity to an acceptable level, thereby decreasing the amount of solvent required, or eliminating the need for solvent altogether.

The treatment medium can be applied to the reticulated foam using any prior art method that applies and controls the appropriate amount of treatment medium. For example, the treatment medium can be applied by spraying, by using a press roller, or "nip and dip" using a conventional adjustable roll bar system. Preferably, the treatment medium is applied using an adjustable roll bar system, whereby the foam is submerged in treatment or treatment is distributed generously to the foam prior to being run through one or more rollers which cause the treatment to be forced into and distributed throughout the foam. By adjusting the tension or gap between the rollers, it is possible to control the amount of treatment that is allowed to remain on the foam.

Further, the amount of treatment can be controlled, dispensed and applied to the foam by a metered spray or stream and then processed through a roller system or with a mechanical pressing action or by hand to force the treatment into the foam and distribute it throughout the foam.

By whatever method, the treatment medium is preferably applied to the foam filter in direct proportion according to its volume, i.e. per cubic inch, cubic centimeter, cubic foot, cubic meter, etc., at a ratio in the preferred range from 0.25 to 2.0 grams of cured treatment medium (minus solvent) to a cubic inch of foam.

The preferred foams of the invention are also characterized as having a final or cured weight (i.e. weight of foam once the solvent has flashed off) of 1.12 to 7.35 times the dry (before treatment) weight. For example, starting with a dry piece of foam weighing 100 grams, once treated and cured, the foam will weigh in the range from 112 grams to 735 grams.

After applying the treatment medium, any solvent should be removed from the treated reticulated foam after treatment. Any prior art method of removal can be used, such as evaporation or flashing, although flashing is preferred with a polybutene/1.1.1. trichloroethane treatment.

Any number of conventional additives can and, in some cases, must be applied to the foam filters of the invention to withstand the conditions of intended use of the filters. For example, anti-oxidants, such as IRGANOX from Ciba-Geigy can be used if desired to prevent degradation of the reticulated foam in high heat and moisture conditions. Anti-oxidants can be mixed either directly or indirectly with the treatment medium. For a typical treatment, 1.0 kg of anti-oxidant should be mixed with about 33 to 500 kg of, e.g., polybutene, or a ratio of 1 to about 33 to 500 parts by weight.

Fire retardants, for instance BROMOKLOR from Ferro Corp., can be used in the treatment if desired. Fire retardants can be mixed either directly or indirectly with the treatment medium. For a typical treatment, BROMOKLOR or its equivalent is preferred and is mixed at a ratio of 1 part fire retardant to about 10 to about 118 parts of e.g., polybutene by weight. For example, 1 kg of BROMOKLOR is mixed with about 10 to about 118 kg polybutene.

The treatment method of the invention produces air filters with a high efficiency. These efficiencies preferably exceed 98%, most preferably they exceed about 99% as measured by SAE J726 Test Procedure for air cleaners. The filtering efficiency can be increased by "layering" the treated foams and by using combinations of treated and untreated foams. For example, when using one $\frac{1}{4}''$ polybutene treated foam filter in a typical filter design with 110 pore/linear inch the design was found to have an efficiency of about 98.52%. However, by substituting at $\frac{1}{4}''$ 110 pore/linear inch polybutene treated foam made from two $\frac{1}{8}''$ layers or one 3/16'' and one 1/16'' split from the $\frac{1}{4}''$ layer, the design had an increased efficiency of 99.00% while the air restriction remained virtually the same. In the latter case, approximately 70-90% of the particulate matter that reaches these layers is entrapped in the first layer. The number of layers used depends on the filter efficiency and capacity required and the degree of air restriction allowed. Where deemed necessary, any layer of the filter design can be split to raise the efficiency of the design.

It is also advantageous to make air filters with layers of treated foam having different porosities. For instance, layers with fewer pores per inch can be used at the air intake region while layers having a greater porosity are used at the air outtake region. The final foam layer should have the finest porosity. Thus, it has been found that a combination of layers of foam provide for high capacity of contaminate holding and high efficiency for protection of the engine or device applicable.

The treatment method of the invention provides a foam filter which operates in a novel manner as compared with prior art treated or untreated filters. Prior art for untreated foam filters states that contaminate particles are trapped in the different layers of foam dependent upon the particle size compared to the foam cell size, i.e. large size particles are trapped in the larger cell sized foam and smaller sized particles are trapped in the smaller or finer cell sized foam. In other words, more or less like a sieve. Through the treatment method of the invention and selection of the different layers of foam as to thickness and cell size, even submicron size particles can be trapped in even the large cell sized foam with great effectiveness.

Further, it has been found that by utilizing multiple layers of the same size cell foam instead of a single layer, i.e. two $\frac{1}{8}''$ thick layers instead of one $\frac{1}{4}''$ layer, greater efficiencies can be achieved with little or no loss to greater restriction. It is theorized that this phenomena can be explained in terms of a "barrier effect" between layers. Thus, working with a 110 ppi foam that is $\frac{1}{4}''$ thick, the maximum effectiveness is that which can be obtained with the 110 ppi foam. However, by splitting that same $\frac{1}{4}''$ thickness into two pieces each $\frac{1}{8}''$ thick or two pieces one of which is 3/16'' and the other 1/16'', it is possible to create a "barrier" effect where the two layers come together which has the effect of a much smaller cell size, but with little or no increase in restriction.

By expanding upon this phenomena, it is possible to substitute multiple layers of a coarser celled foam, which would have a lower restriction than a single layer of a finer celled foam, i.e. 4 layers of 1/16'' thick 80 ppi foam instead of one layer of $\frac{1}{4}''$ 110 ppi foam, in order to achieve equal or higher efficiency but at lower restriction levels.

In certain applications, such as those where mass air flow sensors or other sensitive instrumentation is utilized downstream of the air filter, it is critical that there be no migration or loss of the treatment from the foam media that could contaminate these instruments thereby interfering with their precise ability to monitor the air flow. In these applications not only is it extremely important to choose the proper amount and viscosity of the treatment to be applied, but it may also be necessary to build a "fail safe" design into the filter for the purpose of preventing any treatment from escaping from the filter under extreme conditions and contaminating the described instruments.

With the proper amount and viscosity treatment, it has been found within a given size filter (8''×10'' rectangular filter 1 $\frac{3}{8}''$ thick) that no more than 0.01 g-5.0 g of treatment is likely to be drawn off of the filter media in even the most trying of conditions, i.e. when subjected to an inordinately high air flow or when subjected to higher than normal operating temperatures. It has been found that this amount of treatment can be captured and held within the filter by the utilization of a thin layer of dry (untreated) foam that is placed on the clean side of the filter design. For example, one air filter was constructed having a $\frac{3}{8}''$ layer of 45 ppi foam placed toward the dirty incoming air, followed by a $\frac{3}{8}''$ layer of 60 ppi foam, followed by two $\frac{1}{8}''$ layers of 110 ppi foam all of which were treated as described previously, followed by a final layer of $\frac{1}{8}''$ 110 ppi foam that is not treated, i.e. it is dry. This final layer of foam has sufficient capacity and capabilities to absorb and hold what little treatment may be forced off of the other layers of foam. It is possible to determine the amount of foam required to be utilized in this final layer by monitoring and measuring the amount of treatment that is found to come off of the filter prior to the inclusion of this final layer. Then one simply has to include a sufficient amount of final foam material to sufficiently capture and hold the amount of treatment determined to have come off. If the proper amount and type of foam is chosen for this final "fail safe" layer, very little additional restriction will be added to the overall filter design.

A dry, untreated outer layer (placed towards the incoming dirty air) has also been found to provide certain benefits for the air filters of the invention. From purely a perception viewpoint, any foam that has a treatment applied to it appears to get extremely dirty very fast. Indeed, it is not uncommon for users to discard, clean, or question the service life of treated foam filters simply because they are able to see a rapid collection of contaminate on the filter. Many times the foam filter gets discarded, replaced or an attempt is made to clean it because the perception is that it is "dirty" or "clogged" or "used up." This perception can be virtually eliminated with the addition of a dry, untreated layer of foam placed to the outside of the filter, i.e.

towards the incoming dirty air. By utilizing this additional layer of foam, the filter avoids the appearance of becoming too dirty too quickly. Beneath the dry, untreated outer layer, the rest of the treated filter functions as designed.

A dry, untreated outer layer also performs at least two additional functions. First, this layer of foam actually prevents large particles of contaminate, such as insects, leaf particles, etc. from actually reaching the treated foam layers where they would impinge into or onto the foam causing undue air restriction. By, in effect, knocking these large size particles out of the airstream and preventing them from becoming entrapped in the treated filter layers, the real "filtering" layers are allowed to perform longer. Secondly, particles that are trapped by the dry, untreated outer layer of foam have a tendency to fall off of the filter surface when the engine vibrates or when airflow is stopped. This "self-cleaning" action takes place because this layer of foam, being untreated, does not have a stickiness to it which would entrap any contaminate that impinges upon it or within it. This layer of foam provides a valuable service and allows the "real" filter to last longer. As little as a ⅛" thick layer of dry, untreated foam of a 15–50 ppi cell size will enhance the overall capacity and efficiency of the filter.

FIG. 1 shows the improved foam air filter of the invention designated generally as 11. The air filter 11 shown in FIG. 1 is designed as an automotive air filter having a molded or extruded housing 13 which contains several layers of filter material. In the embodiment of FIG. 1, a thin, dry layer 15 of 15–50 ppi polyurethane polyether or polyester foam faces the incoming dirty air. A thicker layer 17 of 45 ppi foam is backed by a thinner layer 19 of 60 ppi foam and a yet thinner layer 21 of 110 ppi foam. In the example of FIG. 1, a thin dry layer of untreated 60–110 ppi foam completes the filter medium. The clean side of the air filter is retained in place by a wire grid 25 attached to the housing 13 by means of a molded gasket of urethane or plastisol 27.

For automotive use, a typical air filter will include one or two layers of 110 ppi foam totally ⅛ to ½ inch on the clean side, from about ¼ to ½ inch 60 ppi foam and as much 45 ppi foam as the remaining filter space allows.

A particularly preferred filter is constructed as follows:

1. A thin dry outer layer (e.g. ⅛ inch) 15–50 ppi foam facing incoming air;
2. Approximately ¾ inch of 45 ppi foam which generally determines the overall capacity of the filter;
3. Approximately ⅜ inch of 60 ppi foam;
4. Approximately ⅛ inch of 110 ppi foam; and
5. Optionally, a thin dry, untreated foam layer (e.g. ⅛ inch) of 60 to 110 ppi foam.

The following non-limiting examples are intended to be illustrative of the invention:

Comparative testing of three different types and brands of engine air filters designed for the 1986–93 Ford Mustang 5.0 L V8 FI are shown in the table which follows. All units were tested according to SAE J726 Test Procedure in the stock, O.E. housing assembly at 350 CFM constant flow utilizing AC Coarse Test Dust fed at g/min. until a 10" rise in restriction had been reached.

| NOTE # | TEST DATA | FILTER "A" | FILTER "B" | FILTER "C" |
|---|---|---|---|---|
| | Beginning Restriction | 6.35" | 5.50" | 7.20 |
| | Initial Effic. (@ 21 g) | 98.52% | 97.57% | 99.91% |
| 1 | Dust Passed (@ 21 g) | .31 g | .51 g | .02 g |
| | Interim Effic. (@ 100 g) | 99.09% | 98.14% | 99.92% |
| 2 | Dust Passed (@ 100 g) | .91 g | 1.86 g | .08 g |
| | Interim Effic. (@ 256 g) | 99.33% | 98.11% | 99.75% |
| | Dust Passed (@ 256 g) | 1.72 g | 4.84 g | .64 g |
| 3 | Restriction (@ 256 g) | 15.45" | 15.50" | 8.90" |
| 4 | Airflow @ 8.9" Restr. (after 256 g dust fed) | 255 CFM | 246 CFM | 350 CFM |
| 5 | CAPACITY (total dust fed) | 279.00 g | 256.00 g | 632.00 g |
| | OVERALL EFFICIENCY | 99.36% | 98.11% | 99.45% |

LEGEND:
FILTER "A"   FORD (MOTORCRAFT) E6SZ-9601B (FA1042) PLEATED PAPER
FILTER "B"   K & N 33-2015 PLEATED GAUZE
FILTER "C"   PRESENT INVENTION (STTI) MULTI-STAGE FOAM TREATED WITH POLYBUTENE

NOTES:
1. After the initial efficiency dust feed of 21 g, the Ford paper-type filter passed 15.5 times the dust of the STTI filter. The K & N gauze-type filter passed 25.5 times the dust of the STTI filter.
2. After 100 g of dust had been fed to all filters, the Ford filter had passed 11.4 times the dust of the STTI filter. The K & N filter had passed 23.3 times the dust of the STTI filter.
3. After only 256 g of dust had been fed to all filters, the Ford filter was at 15.45"restriction, while the STTI filter was only 8.90" restriction.
4. After 256 g of dust had been fed to all filters, when measured at 8.90" restriction, the Ford filter wasable to flow 255 CFM of air, the K & N filter was only able to flow 246 CFM of air, while the STTI filter was able to flow 37% more air than the Ford filter and 43% more air than the K & N filter after the introduction of 256 g of dust.
5. As a measure of service life, the STTI filter lasted 2.3 times longer than the Ford filter and 2.5 times longer than the K & N filter, i.e. 632 g capacity versus 279 and 256 g respectively.

An invention has been provided with several advantages. The foam filters of the invention have greatly increased efficiency while maintaining an acceptable capacity and without substantially affecting the restriction characteristics of the filter. A variety of filter configurations can be assembled for various end uses. By properly treating and selecting different layers of foam within the filter as to thickness and cell size, even submicron size particles can be trapped in even the larger cell size foams with great effectiveness. By utilizing multiple layers of even the same size cell foam, greater efficiencies can be achieved with little or no loss to greater restriction.

While the invention is shown in only one of its forms, it is not thus limited but is susceptible to various changes and modifications without departing from the spirit and scope of the invention.

I claim:

1. An improved air filter for filtering a dirty incoming stream of air entering a vehicle engine, comprising:
   an outer layer facing the incoming stream of dirty air;
   a plurality of inner treated layers of foam, each of the treated inner layers being coated with a controlled migration treatment medium having a Saybolt Universal viscosity in the range from about 8,500 to 36,000 SUS; and wherein the inner treated layers of foam are further characterized as having a residual amount of controlled migration treatment medium, after removal of solvent, if solvent is present, in the range from about 0.25 to about 2.0 grams of treatment medium per cubic inch of untreated foam filter material.

2. The improved air filter of claim 1, wherein the treated inner layers include mating layers of foam filtering material which are cut from a single piece of reticulated foam having a predetermined pore size.

3. The improved air filter of claim 1, wherein the plurality of inner treated layers of foam include at least two treated layers of foams having differing pore sizes.

4. The improved air filter of claim 1, wherein an untreated foam layer follows the last treated layer on an exit side of the filter.

5. The improved air filter of claim 1, wherein the controlled migration treatment medium is polybutene.

* * * * *